(No Model.)
H. BUSHNELL.
AXLE JOINT FOR ROAD ENGINES.
No. 352,220. Patented Nov. 9, 1886.
Fig. 1  Fig. 2
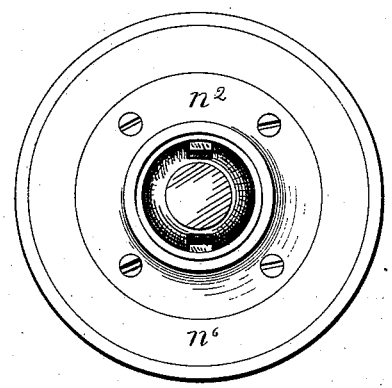 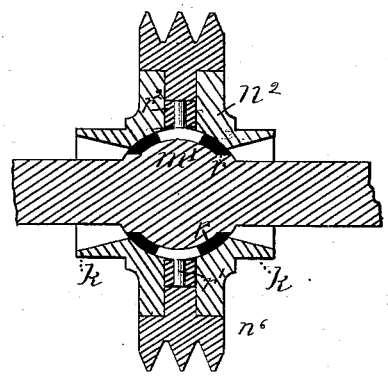
Fig. 3
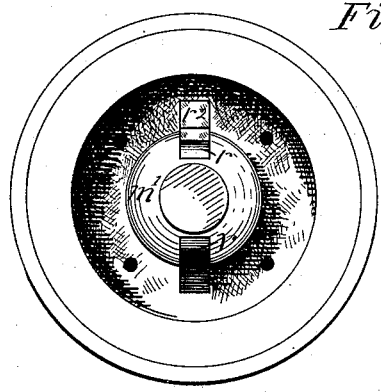
Fig. 4  Fig. 5
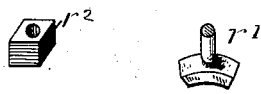
WITNESSES:
George L. Barnes.
John H. Whiting
INVENTOR
Henry Bushnell,
BY Julius Triss,
ATTORNEY

UNITED STATES PATENT OFFICE.

HENRY BUSHNELL, OF NEW HAVEN, CONNECTICUT.

AXLE-JOINT FOR ROAD-ENGINES.

SPECIFICATION forming part of Letters Patent No. 352,220, dated November 9, 1886.

Application filed April 6, 1886. Serial No. 198,015. (No model.)

*To all whom it may concern:*

Be it known that I, HENRY BUSHNELL, a resident of the town of New Haven, in the State of Connecticut, have invented new and useful Improvements in Universal Joints for Axles, of which the following is a specification.

The object of my invention is to provide a device or joint for mounting a driving-wheel on the forward axle of a locomotor or road-vehicle, for transmitting the motion of the driving-wheel to the axle while its axis is deflected from the axis of the wheel.

The invention consists in the novel universal joint hereinafter more fully described and claimed.

In the accompanying drawings, Figure 1 is an end view of a part of the front axle of a locomotor or road-vehicle having a friction-wheel mounted midway upon it by means of my improved joint. Fig. 2 is a longitudinal section through the axle and friction-wheel, showing the means for transmitting the motion of the wheel to the shaft. Fig. 3 is an end view of the device with one of the bearing-plates removed, and Figs. 4 and 5 show details of the mechanism.

Referring to the drawings, $n^6$ designates a wheel or pulley provided with friction V-grooves, and adapted to gear with a corresponding friction-wheel or series of wheels operated by the engines of a locomotor. The friction-wheel is mounted on the forward axle of the vehicle on a globular bearing, $m'$, formed thereon midway between the wheels. Upon each side of the driving-wheels $n^6$ is a bearing-plate, $m^2$, bolted to the wheel and fitting the globular part of the axle, thereby forming a bearing which allows the axle to be deflected from the axis of the wheel in every direction. Each bearing-plate $m^2$ has an exterior cylindrical bearing, $k$, which is adapted to fit in suitable bearings in the frame-work of the locomotor or vehicle, and which holds the wheel in alignment with the engine or motive machinery. The axial perforation through each plate is formed sufficiently larger than the axle to allow the deflection of the shaft as the vehicle is steered.

A pair of steps or bearings, $r^2$, are arranged in the wheel $n^6$ in suitable notches formed in the wheel adjacent to the globular bearing. The steps are held in place by the bearing-plates $m^2$, and are perforated radially. Each step receives a driving stud or pin, $r'$, which is provided with a T-head, as shown. The T-heads of the driving-pins fit into opposite longitudinal grooves or slots, $r$, formed in the globular bearing $m'$ on the axle. As the driving-wheel $n^6$ revolves it carries the axle around by means of the pins, and as the axle is deflected for the purpose of steering the vehicle the pins slide correspondingly in the grooves and oscillate in their steps, thereby allowing universal movement of the axle.

I claim as new and desire to secure by Letters Patent—

In a traction-engine, the combination of the axle having a central globular bearing, $m'$, provided with opposite longitudinal grooves or slots, $r$, the driving-wheel $n^6$, having opposite radial recesses adapted to receive the perforated radial steps $r^2$, the pair of bearing-sleeves $m^2$, bolted, respectively, on opposite sides of the driving-wheel and adapted to secure the steps in place, each having internal concave bearings fitting the globular part of the axle, and external cylindrical journals fitting fixed bearings in the frame-work of the engine, and the oscillating pins $r'$, journaled in the steps $r^2$, and having rectangular heads fitted in the slots, all arranged and combined substantially in the manner and for the purpose specified.

HENRY BUSHNELL.

Witnesses:
GEORGE L. BARNES,
WM. J. ROOT.